May 3, 1932.  F. W. HARNEY  1,856,633
BACKING FOR PLASTIC MATERIAL
Filed Jan. 25, 1930
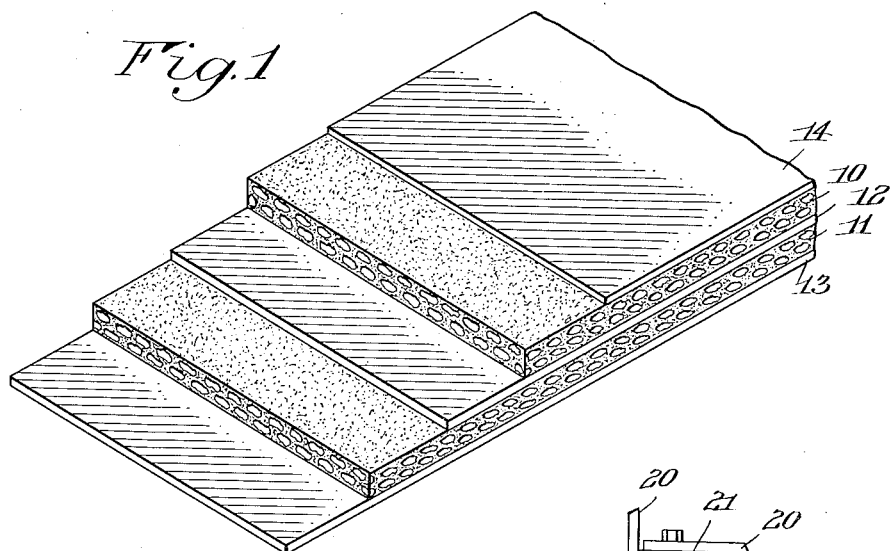
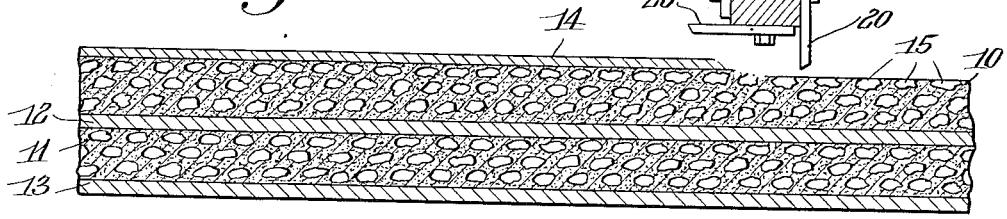
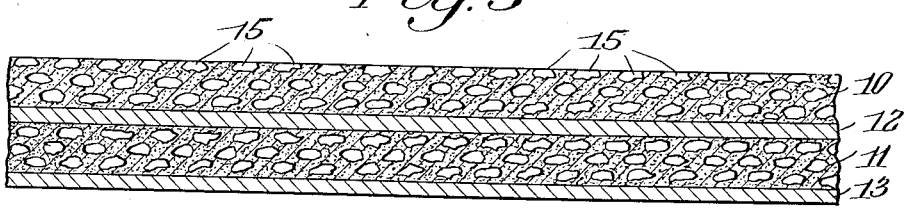
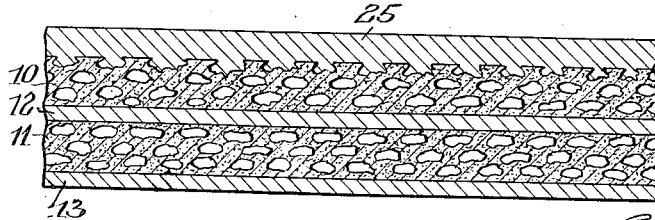
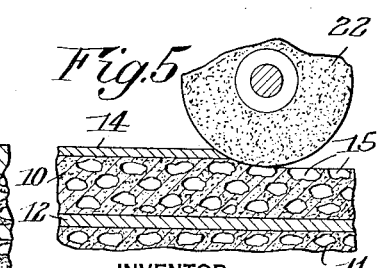
INVENTOR
Francis W. Harney
BY Edward H. Crumpton
his ATTORNEY Patented May 3, 1932

1,856,633

UNITED STATES PATENT OFFICE

FRANCIS W. HARNEY, OF LOCKPORT, NEW YORK, ASSIGNOR TO THE UPSON COMPANY, OF LOCKPORT, NEW YORK, A CORPORATION OF NEW YORK

BACKING FOR PLASTIC MATERIAL

Application filed January 25, 1930. Serial No. 423,525.

This invention relates to a backing or surface for receiving plastic material, such for example as plaster. An object of the invention is to provide a generally improved and relatively easy, rapid, and inexpensive method of producing a satisfactory backing for the reception of plaster or other plastic material.

Another object is to provide a method which results in a surface which forms an exceedingly satisfactory interlocking bond with plastic material applied to such surface.

A further object is the provision of an improved method of making a composite wallboard comprising a backing and a layer of plaster or the like, which method results in a wallboard which is strong and durable, and in which the plaster or the like is intimately and tenaciously interlocked or bonded with the backing.

To these and other ends the invention resides in certain improvements and combinations of parts, all as will be hereinafter more fully described, the novel features being pointed out in the claims at the end of the specification.

In the drawings:

Fig. 1 is a perspective view, with parts broken away, of a backing member at an intermediate stage of its completion according to the present invention;

Fig. 2 is a vertical section through a backing member such as that shown in Fig. 1, illustrating one method of removing a liner to form the completed backing member;

Fig. 3 is a vertical section through a preferred embodiment of completed backing member;

Fig. 4 is a vertical section through a completed wallboard formed by applying a layer of plaster to a backing such as that shown in Fig. 3, and Fig. 5 is a view similar to Fig. 2 illustrating another method of removing one of the liners.

Similar reference numerals through the several views indicate the same parts.

It is desirable that a backing or surface for receiving plastic material should be of such nature that the plastic material will be intimately and tenaciously bonded to the backing or receiving surface. To this end, the present invention contemplates the use of a cellular body as the backing. According to a preferred embodiment of the invention, the cellular body is so treated that a relatively large number of the cells of the cellular body are opened up or exposed, so that the plastic material when applied to the body may enter such exposed cells to form an intimate bond with the body.

A cellular body suitable for the purpose of the present invention may conveniently be made from a material containing, for example, a silicate or other suitable substance which puffs or intumesces upon the application of heat. Preferably, the material is composed principally of sodium silicate and a filler, such as ground limestone. When such a mixture of the proper proportions, as known in the prior art, is treated by the application of heat, the mixture intumesces and forms a body which is permeated by a great number of pockets or cells.

The intumescing operation preferably takes place in a mold or between platens, so that the size and shape of the intumesced product is thus controlled and the expansion of the product during the intumescing operation is limited. When this intumescing is properly carried out, all as known in the prior art, the cells or pores of the resulting product are relatively small and permeate the whole body of the material. By suitably treating the intumesced product, as by baking it or the like, it may be rendered quite hard and moisture resisting to a relatively high degree.

Preferably one or more liners or facings of suitable sheet material are applied to the cellular body, partly to strengthen the resulting product and partly to render more easy the manufacturing operation by preventing sticking of the body to the mold or platen in which it is intumesced. Preferably also a reinforcing sheet is interposed in the cellular body at an intermediate point thereof. This serves to strengthen the resulting product materially, especially since one of the liners or facings is later removed according to the present invention, as will be described below.

The liners as well as the intermediate reinforcing sheet may be of any desired sheet material, such as ordinary paper, cardboard, fabric, or sheet material formed from asbestos, and the material may be treated or untreated as may be desired. When paper or cardboard is used, it is generally advantageous to treat one of the liners to render it moisture resistant.

Fig. 1 of the drawings shows in perspective a product of the kind above described, composed of a cellular body having portions 10 and 11 on opposite sides of an intermediate reinforcing sheet 12, and having also a bottom liner 13 and a top liner 14.

If the liners and reinforcing sheet are applied to the core material before the latter is intumesced, it is found in practice that after intumescing, the liners and reinforcing sheet adhere extremely tenaciously to the core material, so that the resulting product is practically an integral unit and cannot easily be separated.

According to the present invention, one of the liners is removed in order to expose the cells at the surface of the core or cellular body, thus permitting any plastic material applied to the body to enter the exposed cells and to become bonded to the body.

At times it may be possible to manufacture the cellular body without any liner on one face of the cellular body or with a liner which may be stripped easily from the body, as for example, by using a greased or otherwise treated liner which will not adhere to the core. Generally, however, it is necessary to use a liner on each face in order to prevent the material from sticking to the platen and the liner generally adheres tenaciously to the core as has been mentioned above, and this is especially true when the liner is of ordinary paper or cardboard. Accordingly, such a liner cannot be stripped easily from the cellular body, but according to the present invention it may be removed by any suitable means, as by the use of a planer, a grinder, a milling cutter, a sand blast, or the like. The liner which is to be removed may conveniently be of less thickness than the opposite liner which is intended to remain permanently in place, and in the drawings the top liner 14 which is to be removed is illustrated as being thinner than the bottom liner 13 and thinner than the intermediate reinforcing sheet 12. Tissue paper strong enough to withstand passage through the platens may conveniently be used for the liner which is later to be removed. By using a thinner liner, the cost of the liner is reduced and the operation of removing the latter is made easier and less expensive.

When one liner has been removed so that one face of the cellular body is exposed, a considerable number of cells of the cellular body will be open or exposed, and may form a satisfactory surface for the application of plastic material. Ordinarily, however, it is found that a considerable proportion of the cells closely adjacent the surface of the body are closed and thus cannot be entered by the plastic material. The present invention accordingly contemplates the removal not only of the liner, but also of a part of the cellular body itself. It is found in practice that if a layer of the cellular body be removed, the cells which lie just beneath the original surface of the body are thus opened up and exposed, and the result is that a relatively great number of cells are exposed and may be entered by the plastic material so that an exceedingly tenacious bond results between the plastic material and the cellular body.

In practice, the liner may be removed in one operation and a layer of the cellular body may be removed in another operation, or both the liner and a portion of the body may be removed in the same operation. Fig. 2 of the drawings illustrates the removal of the top liner 14 and a layer of the cellular body 10 in one operation by means of a rotary planing element comprising blades 20 of hard material fixed to a rotating shaft 21. In Fig. 5 there is shown an abrading element such as the grindstone 22 for accomplishing the same result of removing the liner 14 and a portion of the cellular body. As stated above, this may be done by any suitable cutting, grinding, or abrading means, and if preferred, the liner may be removed by the use of one means and the layer of cellular body may be removed by the use of a different means.

Obviously the amount of material removed may be varied from time to time as may be desired. In practice, however, it is found that removal of a layer of the cellular body about one sixty-fourth of an inch in thickness is effective to open up a great many more cells than those originally exposed at the surface of the body, and is generally sufficient.

An important aspect of the present invention is that when a planer or grinder or the like is used for removing a liner and/or a part of the cellular body, the resulting or remaining body of material may be finished to precisely a predetermined thickness. Hence when two panels or strips of material are erected next to each other in the wall of a room, they will match with each other perfectly and there will be no shadow or line caused by materials of unequal thickness abutting each other. It is well known that a difference in thickness of only a few thousandths of an inch is sufficient to cause a noticeable shadow at a joint, when light conditions are favorable.

In Fig. 3, there is shown a finished product comprising the cellular portions 10 and 11, the intermediate reinforcing sheet 12, and the liner 13. As shown in this figure the top liner 14 has been completely removed, as has also a layer of the cellular body, so that the cells 15 lying near the original surface of the body have been opened up.

A product such as shown in Fig. 3 prepared by the method above described, furnishes an exceedingly satisfactory base for any plastic material which it may be desired to apply to it. The term "plastic material" as used in this application is intended to include broadly all materials which can be made to flow into the exposed cells of the base, whether or not the material subsequently hardens. For example, the term "plastic material" as here used, includes ordinary plaster, plaster of Paris, stucco, and various cements or adhesives which might be employed to affix any articles, such as cork, linoleum, or rubber to the cellular body.

Although the backing of the present invention is capable of many uses, some of which have been outlined above, yet it is especially useful in connection with making walls or ceilings for building construction. The backing may be nailed to studding or otherwise applied to the frame work of the building, and plaster or the like may subsequently be applied thereto. It is preferred, however, to apply the plaster to the backing before the latter is erected in the building, and thus to make what might be termed a composite wallboard.

The wallboard is constructed by applying a layer of plaster in its wet or plastic state to a backing having a cellular body, such as that shown in Fig. 3. The plaster when applied enters the exposed cells of the body, and upon subsequent drying it become securely interlocked and bonded with the cellular body by reason of the interengagement of the plaster with the cells of the body. Such a wallboard is shown in Fig. 4 of the drawings and comprises the same parts shown in Fig. 3 with the addition of a layer of plaster 25. It will be seen clearly from this figure that the plaster has entered the exposed cells of the cellular body 10, so that the plaster is bonded extremely tenaciously with the cellular body and it is practically impossible for the plaster to become separated from its backing.

A wallboard of the type shown in Fig. 4 is durable and relatively strong, being strengthened by the liner 13 and reinforcing sheet 12. It may be shipped and handled easily, and when properly erected in a building it provides a finished wall surface needing no further plastering.

A cellular body such as that here disclosed not only serves as an excellent backing for plastic material, but also provides effective insulation against passage of heat, due to its cellular structure.

The term "face" as used in this specification and in the accompanying claims is intended to be interpreted in its ordinary or commonly accepted sense as denoting a face of substantial area, usually lying parallel to the finished wall or ceiling surface, and as distinguished from the comparatively narrow edge of a piece of wallboard or the like.

While one embodiment of the invention has been disclosed, it is to be understood that the inventive idea may be carried out in a number of ways. This application is therefore not to be limited to the precise details disclosed, but it is intended to cover all variations and modifications thereof falling within the spirit of the invention or the scope of the appended claims.

I claim as my invention:

1. The method of preparing a receiving surface for plastic material which comprises forming a cellular body with a liner on one face thereof, and removing said liner to expose cells of said cellular body so that plastic material applied to said body may enter such exposed cells to form a bond with said body.

2. The method of preparing a receiving surface for plastic material which comprises forming a cellular body with a liner on one face thereof, and removing said liner and a portion of said body to expose a relatively large number of cells of said body so that plastic material applied to said body may enter such exposed cells to form a bond with said body.

3. The method of preparing a receiving surface for plastic material which comprises forming a cellular body and removing a portion of said cellular body from one surface thereof to expose a relatively large number of cells of said body so that plastic material applied to said body may enter such exposed cells to form a bond with said body.

4. The method of preparing a receiving surface for plastic material which comprises heating an intumescent material containing a silicate to form a hard cellular body, and removing a portion of said cellular body from one surface thereof to expose a relatively large number of cells of said body so that plastic material applied to said body may enter such exposed cells to form a bond with said body.

5. The method of preparing a receiving surface for plastic material which comprises applying an intumescent material containing a silicate to a liner of sheet material, heating said intumescent material to form a hard cellular body attached to said liner, and removing said liner to expose cells of said cellular body so that plastic material applied to said body may enter such exposed cells to form a bond with said body.

6. The method of preparing a receiving surface for plastic material which comprises applying an intumescent material containing a silicate to a liner of sheet material, heating said intumescent material to form a hard cellular body attached to said liner, and removing said liner and a portion of said body to expose a relatively large number of cells of said body so that plastic material applied to said body may enter such exposed cells to form a bond with said body.

7. The method of preparing a receiving surface for plastic material which comprises interposing an intumescent material containing a silicate between a relatively thin liner and a thicker liner of sheet material, heating said intumescent material to form a hard cellular body attached to said liners, and removing the relatively thin liner to expose cells of said cellular body so that plastic material applied to said body may enter such exposed cells to form a bond with said body.

8. The method of preparing a receiving surface for plastic material which comprises interposing an intumescent material containing a silicate between a relatively thin liner and a thicker liner of sheet material, heating said intumescent material to form a hard cellular body between said liners, and removing the relatively thin liner and a portion of said body to expose a relatively large number of cells of said body so that plastic material applied to said body may enter such exposed cells to form a bond with said body.

9. The method of constructing a wall material which comprises forming a cellular body with a liner on one face thereof, removing said liner to expose cells of said cellular body, and applying plaster to the surface of said body from which said liner has been removed, so that said plaster may enter said exposed cells to form an interlocking bond with said body.

10. The method of constructing a wall material which comprises forming a cellular body with a liner on one face thereof, removing said liner and a portion of said body to expose a relatively large number of cells of said body, and applying plaster to the surface of said body from which said liner and portion of the body have been removed, so that said plaster may enter said exposed cells to form an interlocking bond with said body.

11. The method of constructing a wall material which comprises forming a relatively hard cellular body with a layer of reinforcing sheet material interposed therein and a liner of sheet material on each face of said cellular body, removing one of said liners and a portion of said cellular body to expose a relatively large number of cells of said body, and applying plaster to the surface of said body from which said liner and portion of the body have been removed, so that said plaster may enter said exposed cells to form an interlocking bond with said body.

12. The method of constructing a wall material which comprises forming a cellular body with a liner on each face thereof, and removing one of said liners and a portion of said body to leave a predetermined thickness of remaining material, so that one piece of such remaining material will be of the same thickness as another piece thereof irrespective of variations in thickness of the original body.

FRANCIS W. HARNEY.